United States Patent
Yang

(10) Patent No.: US 8,764,363 B2
(45) Date of Patent: Jul. 1, 2014

(54) RIVETING STRUCTURE AND RIVETING METHOD FOR COMBINING TWO WORKPIECES

(71) Applicant: Ren-Jun Yang, Shenzhen (CN)

(72) Inventor: Ren-Jun Yang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/661,263

(22) Filed: Oct. 26, 2012

(65) Prior Publication Data

US 2013/0216331 A1 Aug. 22, 2013

(30) Foreign Application Priority Data

Feb. 21, 2012 (CN) .......................... 2012 1 0038755

(51) Int. Cl.
*F16B 21/00* (2006.01)
(52) U.S. Cl.
USPC ............ 411/339; 411/360; 411/501; 411/504
(58) Field of Classification Search
USPC ................... 411/339, 360, 500, 501, 504, 506
See application file for complete search history.

(56) References Cited

U.S. PATENT DOCUMENTS

| | | | | |
|---|---|---|---|---|
| 375,677 A * | 12/1887 | Kyle | | 411/362 |
| 646,738 A * | 4/1900 | Ingalls | | 411/339 |
| 749,438 A * | 1/1904 | Harrington | | 411/386 |
| 1,845,671 A * | 2/1932 | Lotter | | 281/27.3 |
| 1,993,170 A * | 3/1935 | Havener | | 30/342 |
| 2,132,950 A * | 10/1938 | Green | | 411/339 |
| 2,154,012 A * | 4/1939 | Rhodes | | 411/362 |
| 3,316,793 A * | 5/1967 | Mitchell | | 411/362 |
| 3,702,087 A * | 11/1972 | Schmitt | | 411/362 |

* cited by examiner

*Primary Examiner* — Roberta Delisle
(74) *Attorney, Agent, or Firm* — Novak Druce Connolly Bove + Quigg LLP

(57) ABSTRACT

A riveting structure includes a first workpiece defining a first fixing hole, a second workpiece defining a second fixing hole, a first riveting member and a second riveting member. The first riveting member includes a first head portion and a first riveting portion, the first riveting member defines a riveting hole on the first riveting portion, the first riveting portion extends into the second fixing hole and the first fixing hole. The second riveting member includes a second head portion and a second riveting portion. The second riveting portion extends into the riveting hole of the first riveting member in an interference fit, such that the first workpiece and the second workpiece are fixed together, a receiving chamber is formed between the second head portion and the first riveting portion. The present invention further discloses a riveting method thereof.

20 Claims, 3 Drawing Sheets

RIVETING STRUCTURE AND RIVETING METHOD FOR COMBINING TWO WORKPIECES

BACKGROUND

1. Technical Field

The present disclosure relates to a fastening structure, and more particularly, to a riveting structure and a riveting method for combining two workpieces.

2. Description of Related Art

A riveting assembly may include a rivet sleeve and rivet core. The rivet sleeve includes a main body and a resisting portion connected to an end of the main body. The rivet sleeve axially defines a receiving hole passing through the main body and the resisting portion. The rivet core includes a pulling rod and lock end connected to an end of the pulling rod. When in use, the main body of the rivet sleeve passes through two workpieces, and the resisting portion resists on one workpiece. Then the pulling rod of rivet core passes through the receiving hole of the rivet sleeve toward the resisting portion. Operator uses a hand riveter to pull the pulling rod, and the lock end extends into the receiving hole, then an end of the pulling rod breaks, a flared portion is formed on the end of the main body opposite to the resisting portion by the lock end, such that two workpieces are fixed together by the flared portion and the resisting portion. However, containments and pollutants are produced on an outer surface of the rivet sleeve, such that it is difficult for the workpieces to obtain a very smooth finish. Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
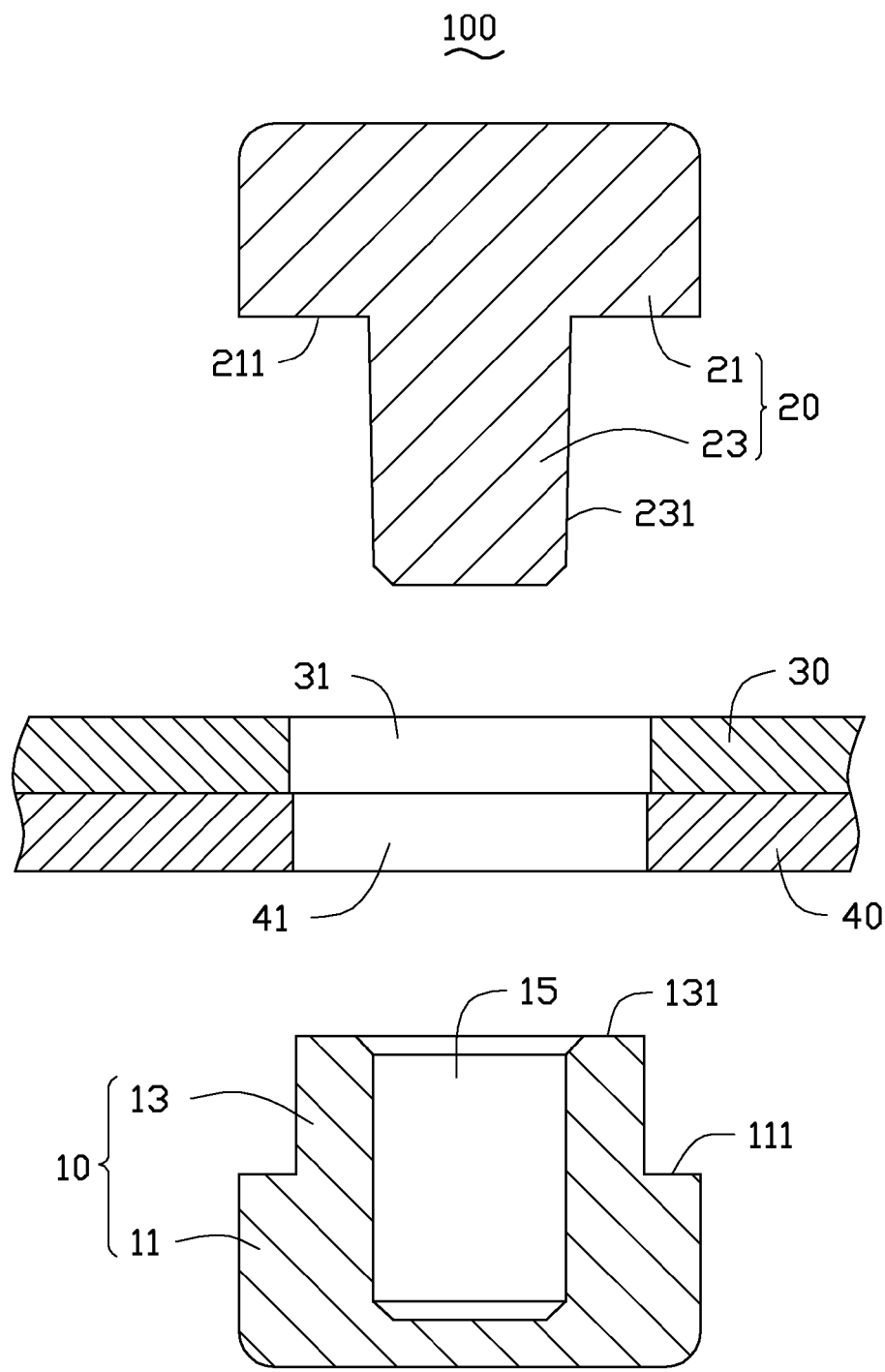
FIG. 1 is a cross-sectional view of an embodiment of a riveting structure before riveting.
Figure 2:
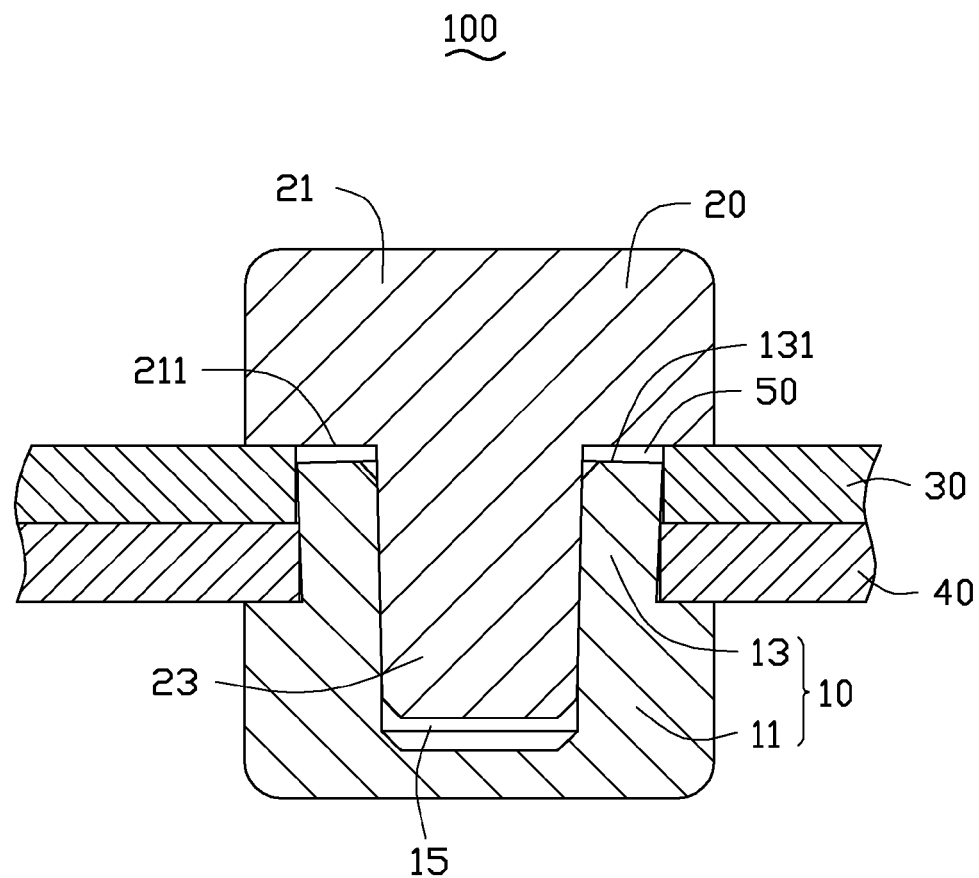
FIG. 2 is a cross-sectional view of the riveting structure of FIG. 1 after riveting.
Figure 3:
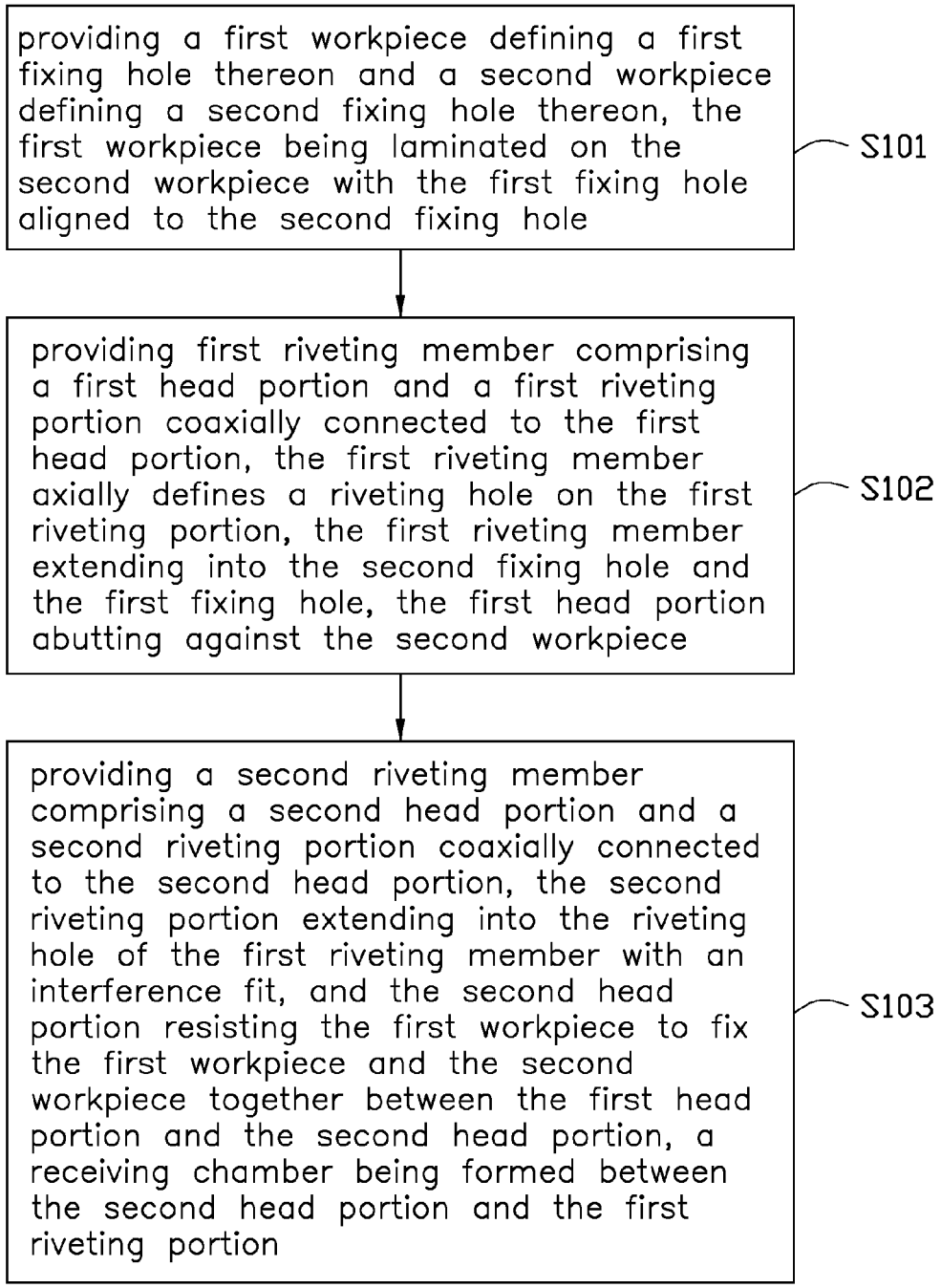
FIG. 3 is a schematic flowchart of a riveting method of the riveting structure of FIG. 1.

FIGS. 1 and 2 show an embodiment of a riveting structure 100. The riveting structure includes a first riveting member 10, a second riveting member 20, a first workpiece 30 and a second workpiece 40. The first workpiece 30 defines a first fixing hole 31 thereon, the second workpiece 40 defines a second fixing hole 41 corresponding to the first fixing hole 31. The first riveting member 10 extends into the second fixing hole 41 and the first fixing hole 31, then the second riveting member 20 extends into first fixing hole 31 and the second fixing hole 41 to meet and engage with the first riveting member 10, such that the first workpiece 30 and the second workpiece 40 are fixed together by the first riveting member 10 and the second riveting member 20. In the embodiment, the first workpiece 30 and the second workpiece 40 are substantially flat plates. The first fixing hole 31 and the second fixing hole 41 are round holes, a diameter of the first fixing hole 31 is greater than that of the second fixing hole 41.

The first riveting member 10 includes a first head portion 11 and a first riveting portion 13 connected to the first head portion 11, the first head portion 11 and the first riveting portion 13 are coaxial with each other. The first head portion 11 is substantially a disk, and the first riveting portion 13 is substantially columnar. A diameter of the first head portion 11 is greater than that of the first riveting portion 13. The first head portion 11 includes a first abutting surface 111 and the first riveting portion 13 is formed on the first abutting surface 111. The abutting surface 111 is an annular surface. The first riveting portion 13 defines a riveting surface 131 on an end thereof away from the first head portion 11. The first riveting member 10 axially defines a riveting hole 15 on the riveting surface 131 extending into the first riveting portion 13 and the first head portion 11. The riveting hole 15 is round and blind. A diameter of the riveting hole 15 decreases along a direction away from the riveting surface 131.

The second riveting member 20 includes a second head portion 21 and a second riveting portion 23 connected to the second head portion 21, the second head portion 21 and the second riveting portion 23 are coaxial with each other. The second head portion 21 is substantially a disk, and the second riveting portion 23 is substantially columnar. A diameter of the second head portion 21 is greater than that of the second riveting portion 23. The second head portion 21 includes a second abutting surface 211 on an end, the second riveting portion 23 is formed on the second abutting surface 211. The second abutting surface 211 is an annular surface. A diameter of the second riveting portion 23 decreases along a direction away from the second head portion 21. The second riveting portion 23 includes a peripheral surface 231.

The riveting method of the riveting structure 100 is illustrated as follows:

Step S101: a first workpiece 30 defining a first fixing hole 31 and a second workpiece 40 defining a second fixing hole 41 are provided, the first workpiece 30 is laid on the second workpiece 40 with the first fixing hole 31 aligned to the second fixing hole 41;

Step S102: a first riveting member 10 is provided, the first riveting member 10 includes a first head portion 11 and a first riveting portion 13 connected to the first head portion 11, the first head portion 11 and the first riveting portion 13 are coaxial with each other. The first riveting member 10 axially defines a riveting hole 15 on the riveting surface 131 extending into the first riveting portion 13 and the first head portion 11, the first riveting member 10 extends into the second fixing hole 41 and the first fixing hole 31, the first head portion 11 abuts against the second workpiece. In the process, the first riveting member 10 extends into second fixing hole 41 and the first fixing hole 31 until the first abutting surface 111 is in contact with a periphery of the second fixing hole 41.

Step S103: a second riveting member 20 is provided, the second riveting member 20 includes a second head portion 21 and a second riveting portion 23 connected to the second head portion 21, the second head portion 21 and the second riveting portion 23 are coaxial with each other. The second riveting portion 23 extends into the riveting hole 15 of the first riveting member 10 with an interference fit, and the second head portion 21 resists the first workpiece 30, such that the first workpiece 30 and the second workpiece 40 are fixed together between the first head portion 11 and the second head portion 21, a receiving chamber 50 is formed between the second head portion 21 and the first riveting portion 13. In the process, the periphery surface 231 of the second riveting portion 23 abuts against the inner sidewall of the riveting hole 15 to expand the first riveting portion 13, such that the first riveting portion 13 is engaged with the first fixing hole 31 and the second fixing hole 41 in an interference fit. The second abutting surface 211 abuts against the first workpiece 30 and is spaced from the riveting surface 131 of the first riveting portion 13, such that the receiving chamber 50 is formed therebetween.

The diameter of the first fixing hole 31 may also be equal to the second fixing hole 41, the first riveting portion 13 may extends into the first workpiece 30 and the second workpiece 40 from the first fixing hole 31.

The riveting hole 15 may have a constant diameter, and the second riveting portion 23 may have a constant diameter.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A riveting structure, comprising:
a first workpiece defining a first fixing hole thereon;
a second workpiece laminated on the first workpiece, the second workpiece defining a second fixing hole thereon aligned to the first fixing hole;
a first riveting member comprising a first head portion and a first riveting portion coaxially connected to the first head portion, the first riveting member axially defining a riveting hole on the first riveting portion, the first riveting portion extending into the second fixing hole and the first fixing hole with the first head portion abutting against the second workpiece; and
a second riveting member comprising a second head portion and a second riveting portion coaxially connected to the second head portion, wherein the second riveting portion extends into the riveting hole of the first riveting member with an interference fit, and the second head portion resists the first workpiece, such that the first workpiece and the second workpiece are fixed together between the first head portion and the second head portion, a receiving chamber is formed between the second head portion and the first riveting portion, and bounded by the first workpiece.

2. The riveting structure of claim 1, wherein the first head portion is substantially disk shaped, and the first riveting portion is substantially column shaped, a diameter of the first head portion is greater than a diameter of the first riveting portion, the first head portion comprises a first abutting surface on an end, the first riveting portion is formed on the first abutting surface, the first abutting surface abuts against the second workpiece.

3. The riveting structure of claim 1, wherein the second head portion is substantially disk shaped, and the second riveting portion is substantially column shaped, a diameter of the second head portion is greater than a diameter of the second riveting portion, the second head portion comprises a second abutting surface on an end, the second riveting portion is formed on the second abutting surface, the second abutting surface abuts against the first workpiece.

4. The riveting structure of claim 2, wherein the first abutting surface is an annular surface, the first riveting portion defines a riveting surface on an end thereof away from the first head portion, the riveting hole is defined on the riveting surface and extends into the first riveting portion and the first head portion.

5. The riveting structure of claim 4, wherein the riveting hole is a blind round hole, diameters of the riveting hole decrease along a direction away from the riveting surface, diameters of the second riveting portion decrease along a direction away from the second head portion, the second riveting portion engages in the riveting hole.

6. The riveting structure of claim 4, wherein the receiving chamber is defined between the riveting surface of the first riveting member and the second abutting surface of the second riveting member.

7. The riveting structure of claim 1, wherein the first fixing hole of the first workpiece and the second fixing hole of the second workpiece are round holes, a diameter of the first fixing hole is greater than a diameter of the second fixing hole.

8. The riveting structure of claim 1, wherein the first riveting portion is expanded by the second riveting portion, and the first riveting portion engages with the first fixing hole and the second fixing hole with an interference fit.

9. A riveting method, comprising:
providing a first workpiece defining a first fixing hole thereon and a second workpiece defining a second fixing hole thereon, the first workpiece being laminated on the second workpiece with the first fixing hole aligned to the second fixing hole;
providing first riveting member comprising a first head portion and a first riveting portion coaxially connected to the first head portion, the first riveting member axially defines a riveting hole on the first riveting portion, the first riveting member extending into the second fixing hole and the first fixing hole, the first head portion abutting against the second workpiece; and
providing a second riveting member comprising a second head portion and a second riveting portion coaxially connected to the second head portion, the second riveting portion extending into the riveting hole of the first riveting member with an interference fit, and the second head portion resisting the first workpiece to fix the first workpiece and the second workpiece together between the first head portion and the second head portion, a receiving chamber being formed between the second head portion and the first riveting portion, and bounded by the first workpiece.

10. The riveting method of claim 9, wherein the first head portion comprises a first abutting surface on an end, the first riveting portion is formed on the first abutting surface, the first abutting surface is an annular surface, the first riveting member extends into second fixing hole and the first fixing hole until the first abutting surface abuts against a periphery of the second fixing hole.

11. The riveting method of claim 9, wherein the first riveting portion defines a riveting surface on an end thereof away from the first head portion, the riveting hole is defined on the riveting surface and extends into the first riveting portion and the first head portion.

12. The riveting method of claim 11, wherein the second head portion comprises a second abutting surface on an end thereof, the second riveting portion is formed on the second abutting surface, diameters of the riveting hole decrease along a direction away from the riveting surface, diameters of the second riveting portion decrease along a direction away from the second head portion, the second riveting portion engages in the riveting hole until the second abutting surface abuts against the first workpiece.

13. The riveting method of claim 12, wherein a periphery surface of the second riveting portion abuts against an inner sidewall of the riveting hole to expand the first riveting portion, such that the first riveting portion engages with the first fixing hole and the second fixing hole with an interference fit.

14. The riveting method of claim 12, wherein when the second abutting surface abuts against the first workpiece, the second abutting surface is spaced from the riveting surface of the first riveting portion, such that the receiving chamber is formed between second abutting surface and the riveting surface.

15. A riveting structure, comprising:
a first workpiece defining a first fixing hole thereon;
a second workpiece laminated on the first workpiece, the second workpiece defining a second fixing hole thereon aligned to the first fixing hole;
a first riveting member comprising a first head portion and a first riveting portion coaxially connected to the first head portion, the first riveting member axially defining a riveting hole on the first riveting portion, the first riveting portion extending into the second fixing hole and the first fixing hole with the first head portion abutting against the second workpiece; and
a second riveting member comprising a second head portion and a second riveting portion coaxially connected to the second head portion, wherein the second riveting portion extends into the riveting hole of the first riveting member with an interference fit, and the second head portion resists the first workpiece, such that the first workpiece and the second workpiece are fixed together between the first head portion and the second head portion, a receiving chamber is formed between the second head portion and the first riveting portion, and bounded by the first workpiece, the receiving chamber is annular and has an external diameter and an inner diameter respectively equal to an external diameter and an inner diameter of a top of the first riveting portion.

16. The riveting structure of claim 15, wherein the first head portion is substantially disk shaped, and the first riveting portion is substantially column shaped, a diameter of the first head portion is greater than a diameter of the first riveting portion, the first head portion comprises a first abutting surface on an end, the first riveting portion is formed on the first abutting surface, the first abutting surface abuts against the second workpiece.

17. The riveting structure of claim 16, wherein the first abutting surface is an annular surface, the first riveting portion defines a riveting surface on an end thereof away from the first head portion, the riveting hole is defined on the riveting surface and extends into the first riveting portion and the first head portion.

18. The riveting structure of claim 17, wherein the riveting hole is a blind round hole, diameters of the riveting hole decrease along a direction away from the riveting surface, diameters of the second riveting portion decrease along a direction away from the second head portion, the second riveting portion engages in the riveting hole.

19. The riveting structure of claim 17, wherein the receiving chamber is defined between the riveting surface of the first riveting member and the second abutting surface of the second riveting member.

20. The riveting structure of claim 15, wherein the second head portion is substantially disk shaped, and the second riveting portion is substantially column shaped, a diameter of the second head portion is greater than a diameter of the second riveting portion, the second head portion comprises a second abutting surface on an end, the second riveting portion is formed on the second abutting surface, the second abutting surface abuts against the first workpiece.

* * * * *